United States Patent

Schwendimann

[11] Patent Number: 4,464,871
[45] Date of Patent: Aug. 14, 1984

[54] COMBINED STRUCTURAL AND SOLAR PANEL

[76] Inventor: Robert Schwendimann, Reinhold-Frei-Strasse 15, Zurich, Switzerland

[21] Appl. No.: 215,543

[22] Filed: Dec. 11, 1980

[30] Foreign Application Priority Data

Dec. 17, 1979 [CH] Switzerland ............... 11167/79
Apr. 23, 1980 [CH] Switzerland ............... 3146/80

[51] Int. Cl.³ ............... F24J 3/02; E04B 5/48; E04F 17/08
[52] U.S. Cl. ............... 52/220; 52/585; 126/448; 126/450; 285/231; 285/369; 285/371
[58] Field of Search ............... 52/220, 585, 127, 584; 126/448, 450, 443; 285/137 R, 421, 371, 369, 231

[56] References Cited

U.S. PATENT DOCUMENTS

| | | | |
|---|---|---|---|
| 494,036 | 3/1893 | Smith | 52/584 |
| 1,329,121 | 1/1920 | Hachman | 285/371 |
| 1,712,895 | 5/1929 | Metcalf | 52/220 |
| 1,971,320 | 8/1934 | Cederquist | 52/585 |
| 2,328,823 | 9/1943 | MacKenzie | 52/585 |
| 2,559,198 | 3/1951 | Ogden | 52/584 |
| 3,064,321 | 11/1962 | Rose | 52/584 |
| 3,120,967 | 2/1964 | Kazienko | 285/231 |
| 3,245,702 | 4/1966 | Smith | 285/369 |
| 3,260,027 | 7/1966 | Page et al. | 52/572 |
| 3,387,864 | 6/1968 | Walters | 285/371 |
| 3,859,674 | 1/1975 | Thomson | 52/220 X |
| 3,916,871 | 4/1975 | Estes et al. | 126/450 |
| 3,992,835 | 11/1976 | Saveker | 52/220 |
| 4,084,842 | 4/1978 | Stonitsch | 285/369 X |
| 4,278,076 | 7/1981 | Hopper | 126/450 |

FOREIGN PATENT DOCUMENTS 2615428 10/1977 Fed. Rep. of Germany ...... 285/231

*Primary Examiner*—Alfred C. Perham
*Attorney, Agent, or Firm*—Murray Schaffer

[57] ABSTRACT

An arrangement of combined structural and solar panels wherein each panel is formed of a parallelepiped body having a bore formed in each one of a pair of opposed side edges. The bore is provided with a conically enlarged recess, and a pipe section which extends within the recess. The pipe sections are placed in registry when a pair of panels are abutted edge to edge, and a coupling is secured over the registered pipe sections to join and seal the connection.

7 Claims, 4 Drawing Figures

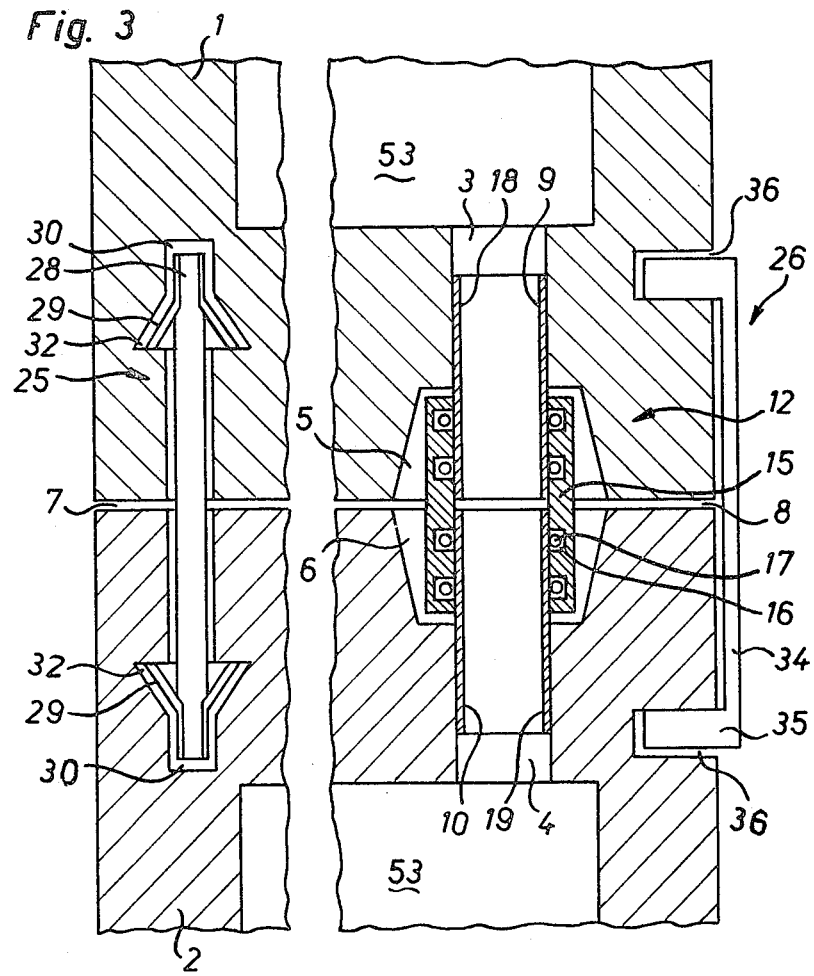
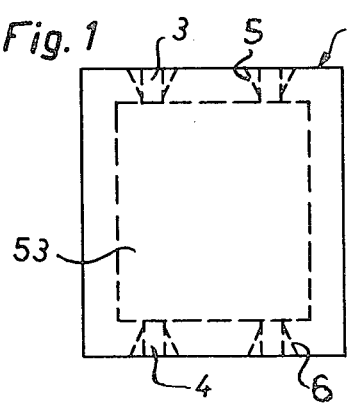
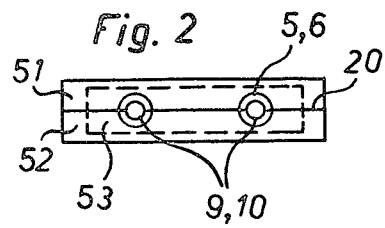

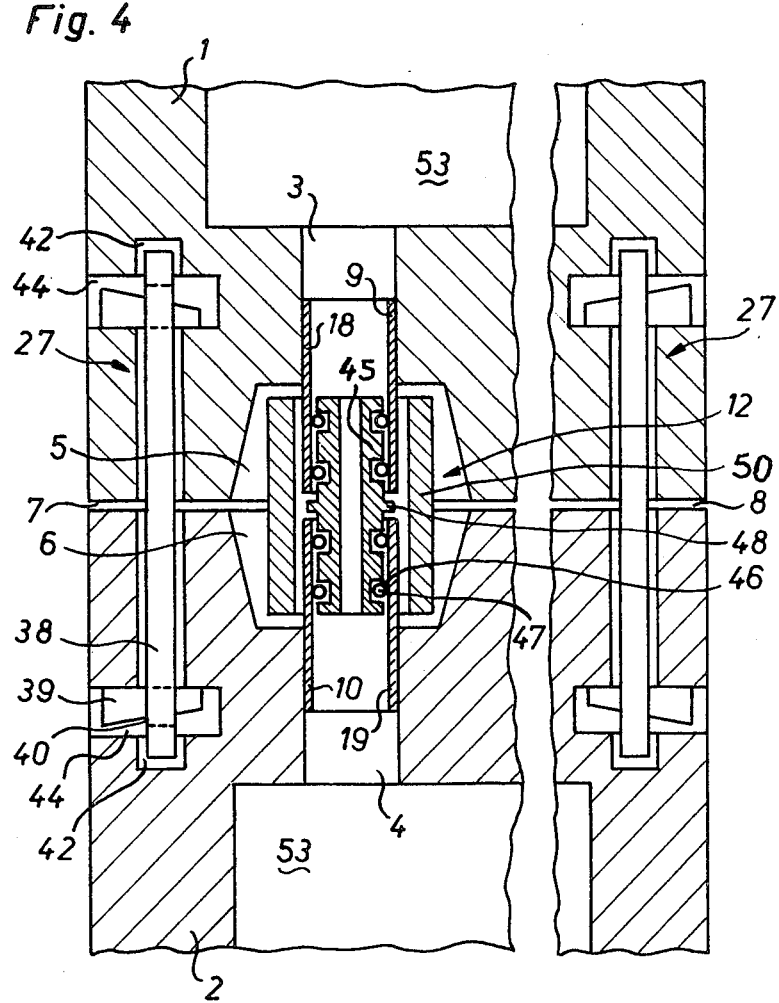

COMBINED STRUCTURAL AND SOLAR PANEL

BACKGROUND OF THE INVENTION

The present invention relates to a combined structural and solar panel which may be arranged in contiguous abutment with other similar panels to form a wall or wall section, in which a fluid, to be heated, is circulated.

Considerable efforts are being made to use solar heat either for the purposes of radiant space heating or for the heating of water. It has been known to provide outer walls of buildings or similar structures with solar panels, which contain fluid carrying components. Under solar irradiation, the fluid within these components are heated and is either stored or is supplied directly for use. Such panels, for example, are made in the form of plates or slabs of concrete, ceramic, or other similar material. Pipe sections are inserted into the plates and when such plates are arrayed or abutted to form the outer wall of the building, the pipe sections adjoin to form an interlinked pipe line for the circulation of fluid.

When such plates are laid in this way, it is important to obtain a reliably tight connection between the pipe sections of two abutting contiguous components. This leads, however, to considerable difficulties because, even though care is taken in fitting the plates, they are frequently displaced, even by a few millimeters. The plates are also subject to the influence of heat variation which causes expansion and contraction, which must be compensated for by the pipe connection at the junctions of the abutting components.

It is the object of the present invention to provide structural solar panels of the type that can be arranged in abutting relationship to form wall or wall sections, wherein the stresses and deformation which occur, either when the wall is formed, or during use, are compensated for by particularly tight connections.

It is further an object of the present invention to provide solar and structural panels of the type described which can be easily manufactured and easily fitted together. A further object of the present invention is to provide a combined structural and solar panel which is provided with socket connections for fitting or forming fluid or pipe conduits which may be easily and securely linked with the similar sockets of similar panels. These objects and other objects and advantages, will be apparent from the following disclosure of the present invention.

SUMMARY OF THE INVENTION

According to the present invention, wall or wall sections can be formed of abutting blocks or panels, each of which is formed of a parallelepiped body in which fluid conduits are located. Each of a pair of opposed edges of the body is formed with a bore having an enlarged recess and a pipe section is inserted into the bore to extend into the recess. The panels are identical and are formed so that when two panels are placed in abuttment, corresponding pipe sections are aligned in registry. A coupling sleeve is fit over, or into, the registered pipe sections securely joining and sealing the pipe sections, thereby forming a socket-like interconnection between the fluid conduits of the adjacent panels.

Preferably, the panels can be formed of cement, ceramic or similar material in two half-sections which can be joined together to form a hollow parallelipiped body.

The coupling members are preferably provided with additional seals such as annular 0-rings or packings.

In addition, means are provided in the form of anchors to hold the two abutting panels to each other and thereby prevent their separation under stress, or increased internal pressure.

Full details of the present invention are set forth in the following description and are shown in the accompanying drawing.

BRIEF DESCRIPTION OF THE DRAWINGS

The accompanying drawings;

FIG. 1 is a plan view of a combined structural and solar panel of the present invention, FIG. 2 is side view of the panel of FIG. 1, FIG. 3 is a sectional view through a pair of panels each formed according to the present invention, arranged in abutment with each other, showing the interconnection of the fluid conduits, and means for securing the panels in abutment.

FIG. 4, is a view similar to that of FIG. 3, showing additional means for securing the panels as well as another embodiment for fluid inter-connection.

DETAILED DESCRIPTION OF THE PRESENT INVENTION

Turning first to FIGS. 3 and 4, a section of wall is shown formed of structural solar panels or blocks laid in abutting engagement. In these figures, only two panels, 1 and 2 are shown. The panels are identical and it will be obvious that any member may be arranged to form a completed wall. The panels are provided with bores 3 and 4, having enlarged countersunk conical recesses 5 and 6 respectively at their outer ends, which are formed in each one of a pair opposed side edges 7 and 8. The bores 3 and 4 are provided with sleeves 9 and 10 respectively, which issue into the conical recesses 5 and 6 but extend no further than the plane of the walls 7 and 8. The rear ends 18 and 19 of the respective sleeves 9 and 10 may be frictionally retained in the bores 3 and 4 or they may be glued or bonded so as to be fixed against axial movement.

As seen in FIG. 2, each of the combined structural and solar panels may easily be formed of a pair of identical parallelepiped sections 51 and 52, arranged in mirror image to each other; each of these sections being formed of a flat base and a perpendicularly extending peripheral flange having flat coplanar edges 20, which, when placed together in mirror image, form a hollow interior cavity 53. The two sections may be secured together at their flange edges 20 as by gluing, or otherwise bonding the two together, so as to form a unitary, relatively thick walled block or panel.

The blocks or panels 1 and 2 can be formed with any material, although it is advantageous to use material having an adequate heat storing characteristic; as for example, concrete ceramic or the like. Such material makes the formation of the blocks or panels simple, since the sections 51 and 52 can be easily cast, molded or worked. The bores 3 and 4 can be formed by routing or boring the end walls after the blocks are finished, or they can be formed in half round sections when each of the block sections 51 and 52 are fabricated. The bores 3 and 4 can also be lined with suitable pipe sections.

As will be apparent, the bores 3 and 4 are symmetrically aligned, so that the sleeves 9 and 10 register with each other when two panels are placed in appropriate abutment shown in FIGS. 3 and 4 somewhat spaced only for clarity in reading the drawings.

The bores 3 and 4 are thus caused to be interlinked by a socket-like arrangement generally depicted by the numeral 12, comprising the sleeves 9 and 10 and a sealing coupling member so as to form a fluid tight and sealed interconnecting through conduit communicating with the cavities 53 in each of the adjacent panels.

In the embodiment of FIG. 3, the frontal ends of the inserted sleeves 9 and 10 lie within the plane of the side faces 7 and 8, so that they engage with one another. Surrounding the abutting ends of the sleeves 9 and 10 is a coupling 15 having a plurality of annular slots or grooves 16 on the inner surface in which are inserted 0-rings 17 or similar packings. The joint between the sleeves 9 and 10 of the adjacent panels is thus sealed against liquid seapage, as well as securely held by the coupling 15. The number of slots and rings and/or packings, can be selected as desired. The extending sleeves and surrounding couplings form a socket that can be easily assembled.

In the embodiment shown in FIG. 4, the sleeves 9 and 10 do not extend to the plane of the faces of the abutting side 7 and 8, but are maintained just short thereof so that a small space exists between the frontal ends of the sleeves even though the sides 7 and 8 are in abutment.

A tubular coupling 45 is inserted within the sleeves and is provided on its external surface with annular slot 46 in which suitable seal means 47 is lodged. The internal coupling 45 is provided with an annular collar 48 midway along its length which projects radially outward between the opposed frontal ends of the sleeves 9 and 10, so that when the panels are abutted against each other, a seal is formed between them.

In the embodiment of FIG. 3, the coupling 15 has a length only slightly less than the combined depth of the recesses 5 and 6, so that the coupling is held in these recesses without substantial axial movement, thus, maintaining a secure coupling and sealing of the abutting sleeves 9 and 10. On the other hand, in the embodiment of FIG. 4, the size of the coupling 45 is not critical since the coupling is prevented from axial movement by the wedging of the collar 48 between the frontal ends of the pipes 9 and 10.

When a plurality of panels, such as 1 and 2, are joined together, as for example, forming a covering for a building wall itself, the fluid circulating through the bores 3 and 4, when heated, increase in pressure which produces a force tending to push the panels apart causing separation of the abutting sides 7 and 8. In order to prevent such separation, at least one anchoring member adjoining the abutting panels, should be provided. The number of anchoring members is to be determined as a function of the pressure prevailing between the adjacent panels and can be either pre-selected by known calculation, or can be empirically determined.

One such anchoring member is generally depicted by the numeral 25 in the left hand portion of FIG. 3. The anchoring member 25 comprises an elongated tie rod 28 having at least one spreading retaining member 29 at each end. Each panel is provided with an elongated hole 30 having a conical enlargement 32 into which the spreading retaining members 29 are first depressed and then spread out to fit and seat against. In this manner, the two adjacent panels can be pushed together with the anchoring member to fit in the bore 30 so that when the two are in abutment, the anchoring member is firmly seated into place, preventing the panels from being pulled apart.

A second type anchoring member, generally depicted by the numeral 26, is shown in the right hand side of FIG. 3. This anchoring member 26 comprises a clip having a central resilient tensioning member 34, provided with parallel hook fingers 35 at each end. Outer wall surfaces of each of the panels are provided with a slot 36 adapted to receive the hooks 35. The connecting tension member 34 is of a length and of a resilient tension so that upon introduction of hooks 35 into the holes 36, the entire clip bends and is biased to draw the two adjacent panels 1 and 2 together in firm attachment. As the connecting tension member 34 projects only slightly from the surface of the panels, they do not require recessing below the surface of the panels and grooves for this part of the clip is unnecessary although the same may be provided, if desired. Since the clips may be exposed to weather, it is preferred that these be made of non-corrosive material such as stainless steel, reinforced plastic or the like.

In FIG. 4, a third embodiment of an anchoring member, generally depicted by the numeral 27, is shown. This anchoring member comprises a tie rod 38, having a wedge 39, passing through an aperture or eyelet 40 at each end of the tie rod. As in the case of the anchoring member depicted by the numeral 25 in FIG. 1, the tie rod is inserted in an elongated bores of 42 formed in opposition to each other at each end of the panel blocks. However, in this instance, the panel blocks must be made with transverse holes 44 to accomodate introduction of the wedges 39.

As seen in FIG. 4, the abutting insert sleeves 9 and 10 are surrounded by a protective sleeve 50 which prevents moisture, dirt and other impurities from entering the space about the collar 48.

Preferably, the coupling 15 and the coupling 45, as well as the protective sleeve if used, are made of plastic material although metallic materials can also be used. The protective sleeve 50 may also have seal means such as those shown on the coupling 15. If so, a double seal is obtained in the embodiment of FIG. 4 which enables an extremely reliable seal to be formed permitting continued operation for an extended period of years. Although the interior coupling 45 has generally a smaller diameter than the inner diameter of inserts sleeves 9 and 10, no disadvantage is found because there is no significant pressure loss occurring as a result of the quantity of fluid flowing through the panels.

The socket connections 12 between the adjacent panels, while being extremely simple, are also extremely reliable and even in the event of displacement of the adjacent blocks 1 or 2 from each other, or deformation due to thermal action, the connection remains lightly sealed. Furthermore, the assembly of the components forming the connection also presents little problem since the length of the coupling 15, as well as the length and collar of the coupling 45 are so fixed, that sealing of the connection 12, when the abutting panels 1 and 2 are pushed together, is insured.

It is also possible to extend the inner ends 18 and 19 of the sleeves 9 and 10 respectively, so as to form a continuous sleeve or pipe through the adjacent panel. However, the heat transfer from the material from which panel is formed to the fluid circulating in the bores 3 and 4 and the space 53, is less impeded in the embodiments shown in FIGS. 3 and 4 than in the case where a through pipe would be used.

The panels themselves can be constructed in the form of smooth plates or slabs which can be used for forming or for lining horizontal, vertical and/or sloping walls. They can also be shaped and dimensioned in the form of tiles, which partly overlap each other when aligned. That is, the side wall through which the bores are formed would lie beneath an overlapping portion of the tile and would there be completely covered from the exterior. The construction, however, of such tiles, would be the same as either of the two embodiments described herein even though having overlapping abutting faces, since the pipe connection can be made between abutting edges underlying the overlap, so that a reliable connection is formed in spite of a possible reciprocal displacement of such tiles.

Various modifications and changes have been described herein, other changes and modifications will be obvious to those skilled in the art. Accordingly, it is intended that the present disclosure be taken as illustrative only of the invention and not limiting thereof.

What is claimed is:

1. Interconnecting arrangement of structural and solar panels, each panel comprising a parallelepiped body having at least one pair of opposed planar side edges and fluid conduit means located in the interior thereof, at least one bore in communication with said fluid conduit means extending between said side edges and having an enlarged recess at each end opening to a respective one of the side edges, a pipe section located at each end of said bore and extending outwardly into the corresponding side recess a distance no greater than to the plane of said edge, said panels being formed to permit the alignment of paired panels in abutting edge to edge relationship with their pipe sections in registry a first bushing having a length substantially equal to the sum of the abutting recesses to surround the exposed exterior circumferential surfaces of the registered pipe sections, and a pair of o-ring seal means interposed between the surface of said bushing and the associated surfaces of each of the registered pipe sections to permit relative sliding movement between pipe and bushing without loss of fluid, and a second tubular bushing inserted within said registered pipe sections, said second bushing having an annular collar substantially midway along its length adapted to be interposed between the abutting pipe sections so that said second bushing maintains a portion thereof in each pipe section.

2. The arrangement, according to claim 1, including anchor means at least partially embedded in said panels for securing abutting panels to each other.

3. The arrangement, according to claim 1, including anchor means at least partially embedded in said panels for securing abutting panels to each other.

4. The arrangement, according to claim 3, wherein said anchoring means comprises a tie rod adapted to fit within holes formed in abutting panels and provided with means at each end for retaining said tie rod in said holes.

5. The arrangement, according to claim 3, wherein said anchoring means comprises a resilient clip bridging said panels and adapted to be inserted within holes formed on the surface of said panels.

6. Interconnecting arrangement of structural and solar panels, each panel comprising a parallelpiped body having at least one pair of opposed planar side edges and fluid conduit means located in the interior thereof, at least one bore in communication with said fluid conduit means extending between said side edges and having an enlarged recess at each end opening to a respective one of the side edges, a pipe section located at each end of said bore and extending outwardly into the corresponding side recess, a distance no greater than to the plane of said edge, said panels being formed to permit the alignment of paired panels in abutting edge to edge relationship with their pipe sections in registry and a tubular bushing slidably inserted within said registered pipe sections and bridging the registered pipe sections and overlapping with inner circumferential surface thereof, and a tubular sleeve surrounding said registered pipe sections and slidably overlapping the outer circumferential surface thereof, said bushing having a collar substantially midway between its ends so that a portion is maintained within each pipe section, said sleeve having a length approximately twice that of the enlarged recesses so as to be retained on said pipe sections by said recesses, a pair of o-ring seals interposed between the surface of said bushing and the associated surfaces of each of said registered pipe sections, said panels being coupleable in situ and axially displaceable relative to each other during use without loss of fluid.

7. The arrangement, according to claim 6, including anchor means at least partially embedded in said panels for securing abutting panels to each other.

* * * * *